(12) United States Patent
Hecht

(10) Patent No.: US 8,708,613 B2
(45) Date of Patent: Apr. 29, 2014

(54) LEFT-HANDED AND RIGHT-HANDED CUTTING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 129 days.

(21) Appl. No.: 13/443,565

(22) Filed: Apr. 10, 2012

(65) Prior Publication Data

US 2013/0266384 A1    Oct. 10, 2013

(51) Int. Cl.
*B23B 27/06* (2006.01)

(52) U.S. Cl.
USPC .............. 407/103; 407/90; 407/117; 407/104

(58) Field of Classification Search
USPC ................ 407/103, 104, 105, 88, 89, 90, 117
See application file for complete search history.

(56) References Cited

U.S. PATENT DOCUMENTS

| | | | | |
|---|---|---|---|---|
| 3,172,191 | A * | 3/1965 | Schoffel et al. ............... | 407/103 |
| 3,545,061 | A * | 12/1970 | Michael ........................ | 407/90 |
| 4,283,163 | A * | 8/1981 | Grafe et al. .................... | 407/104 |
| 6,086,291 | A * | 7/2000 | Hansson et al. ............... | 407/110 |
| 6,109,152 | A * | 8/2000 | Hecht ............................ | 82/160 |
| 7,001,114 | B2 * | 2/2006 | Blucher et al. ................ | 407/103 |
| 7,407,347 | B2 * | 8/2008 | Virtanen et al. .............. | 407/110 |
| 8,147,171 | B2 * | 4/2012 | Dufour et al. ................. | 407/113 |
| 2006/0008336 | A1 * | 1/2006 | Neumann et al. ............. | 409/234 |
| 2012/0201616 | A1 | 8/2012 | Hecht | |

FOREIGN PATENT DOCUMENTS

| | | |
|---|---|---|
| CH | 692449 A5 | 6/2002 |
| DE | 34 48 086 | 8/1985 |
| DE | 3739945 A1 * | 6/1989 |
| JP | S59 134613 A | 8/1984 |
| KR | 20-0211403 | 1/2001 |
| WO | WO 2006/136338 A1 | 12/2006 |

OTHER PUBLICATIONS

International Search Report dated Jul. 16, 2013 issued in PCT counterpart application (No. PCT/IL2013/050258).

* cited by examiner

*Primary Examiner* — Andrea Wellington
*Assistant Examiner* — Nicole N Ramos
(74) *Attorney, Agent, or Firm* — Womble Carlyle

(57) ABSTRACT

In a cutting tool used for internal machining operations, a cutting insert with a single cutting portion is removably secured to an insert holder. The cutting insert has two opposing end surfaces, and an insert peripheral surface extending therebetween having three spaced apart abutment surfaces. The insert holder has a holder portion with a holder peripheral surface and an adjacent seating surface. At least one protuberance having four spaced apart reaction surfaces protrudes from the seating surface. The cutting insert is securable to the holding portion in left-hand and right-hand assembly positions, with the three abutment surfaces in clamping contact with three of the four reaction surfaces. In the left-hand assembly position, a first end surface is in clamping contact with the seating surface, and in the right-hand assembly position, a second end surface is in clamping contact with the seating surface.

26 Claims, 4 Drawing Sheets

LEFT-HANDED AND RIGHT-HANDED CUTTING TOOL

FIELD OF THE INVENTION

The present invention relates to left-handed and right-handed cutting tools for use in metal cutting processes in general, and for internal machining operations in particular.

BACKGROUND OF THE INVENTION

Within the field of internal machining operations, cutting tools are known having cutting inserts detachably secured to an insert holder. In such cutting tools the cutting insert may contact the insert holder at several engagement regions in order to secure the cutting insert. However, these engagement regions may not permit the same cutting portion to be operative in both left-hand and right-hand assembly positions.

German Patent DE 3448086 discloses an insert holder and a cutting insert having a single cutting portion, for internal grooving. The cutting insert has three radially extending protrusions and the insert holder has three radially extending grooves. The insert and the holder are coupled together when the protrusions are placed in the grooves.

U.S. Pat. No. 7,001,114 discloses an insert holder and a cutting insert having a single cutting portion, for internal grooving, where the coupling includes two interacting surfaces disposed on the insert and the holder, respectively. The interacting surfaces are profiled to intermesh with one another to define an intermeshing region of the coupling.

KR 20-2000-0020103 discloses a boring tool having a cutting insert with a single cutting portion detachably fixed to a cylindrical holder by means of a screw. A pair of dome-shaped protrusions and a plurality of first serrations extending perpendicularly to the dome-shaped protrusions on a bottom surface of the cutting insert are located in a V-groove and a plurality of second serrations, respectively, in a top surface of the holder. Inclined surfaces on the plurality of first serrations come into contact with correspondingly inclined surfaces of the second serrations to prevent rotation of the cutting insert during a cutting operation, and part of the dome-shaped protrusions come into contact with an inclined surface of the V-groove to assist in preventing rotation of the cutting insert and to achieve a precise location of the cutting insert with respect to the holder.

It is an object of the present invention to provide an improved cutting tool.

It is also an object of the present invention to provide an improved cutting tool with a cutting insert having a single cutting portion removably securable to an insert holder in left-hand and right-hand assembly positions.

It is a further object of the present invention to provide an improved cutting tool with a cutting insert which can be efficiently manufactured.

SUMMARY OF THE INVENTION

In accordance with one aspect of the present invention, there is provided a cutting tool comprising a cutting insert with a single cutting portion, an insert holder and a fastener, the cutting insert having two opposing end surfaces with an insert peripheral surface and an insert central axis extending therebetween, the insert peripheral surface having three spaced apart abutment surfaces, and the insert holder having a holding portion extending along a longitudinal axis, the holding portion having a holder peripheral surface and an adjacent seating surface, with at least two protuberances protruding from the seating surface, the at least two protuberances defining four spaced apart reaction surfaces transverse to the seating surface, the cutting insert being securable to the holding portion in left-hand and right-hand assembly positions by means of the fastener, with the three abutment surfaces in clamping contact with three of the four reaction surfaces, wherein:

in the left-hand assembly position, the first end surface is in clamping contact with the seating surface; and in the right-hand assembly position, the second end surface is in clamping contact with the seating surface.

In accordance with another aspect of the invention, there is provided a left-handed and right-handed cutting insert comprising:

two opposing end surfaces with an insert peripheral surface and an insert central axis extending therebetween, the insert peripheral surface having three spaced apart circumferential abutment surfaces, with one of the three circumferential abutment surfaces facing in a first generally circumferential direction and the other two circumferential abutment surfaces facing in a second generally circumferential direction opposite to the first generally circumferential direction, and a single cutting portion having a cutting edge formed by the intersection of a rake surface and a relief surface, the rake surface and the relief surface located on the insert peripheral surface; wherein:

the cutting edge protrudes farther in a radial direction relative to the central axis than any of the three abutment surfaces;

the cutting insert exhibits mirror symmetry about a plane which is perpendicular to the insert central axis and bisects the cutting edge.

In accordance with still another aspect of the invention, there is provided a cutting tool comprising an insert holder, a fastener and the aforementioned cutting insert.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
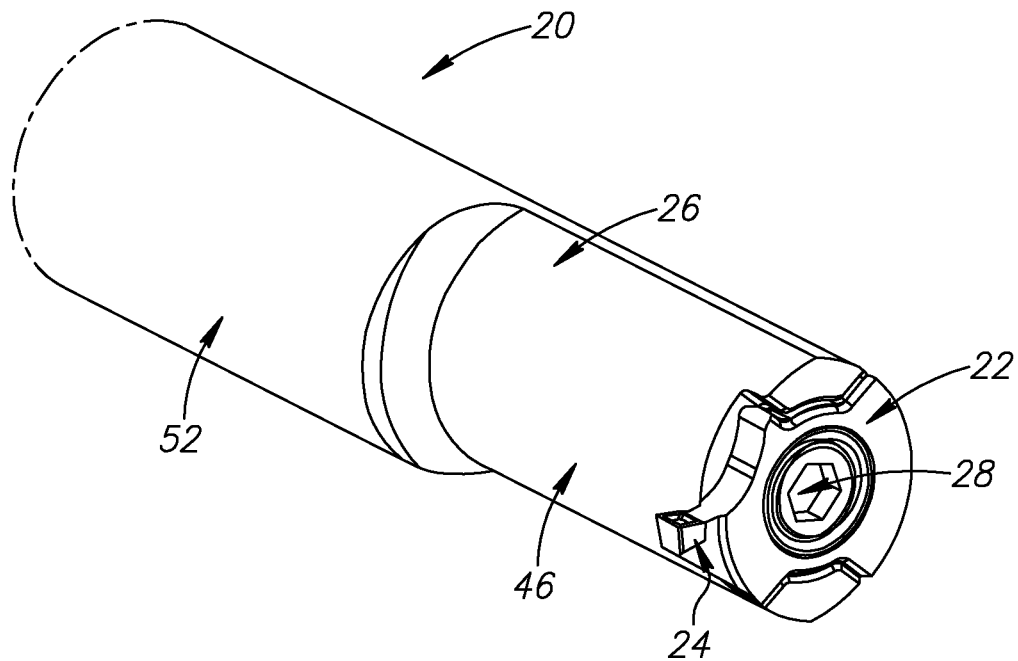
FIG. 1 is a perspective view of a cutting tool in accordance with some embodiments of the present invention.
Figure 2:
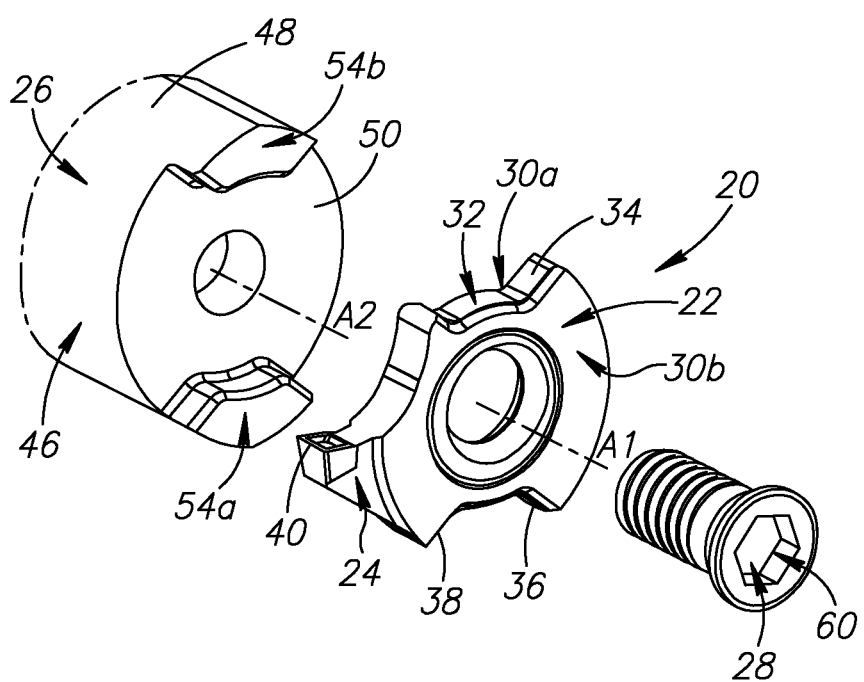
FIG. 2 is an exploded perspective view of the cutting tool in accordance with some embodiments of the present invention.

The present invention relates to a cutting tool 20 comprising a cutting insert 22 with a single cutting portion 24, an insert holder 26 and a fastener 28.

In some embodiments of the present invention, the cutting tool 20 may be used for internal machining operations.

Attention is drawn to FIGS. 1 to 4, showing the cutting insert 22 removably secured to the insert holder 26 in left-hand and right-hand assembly positions by means of the fastener 28.

In some embodiments of the present invention, the insert holder 26 may be manufactured from machined steel, and the cutting insert 22 may preferably be manufactured by form pressing and sintering a cemented carbide, such as tungsten carbide, and may be coated or uncoated.

Figure 5:
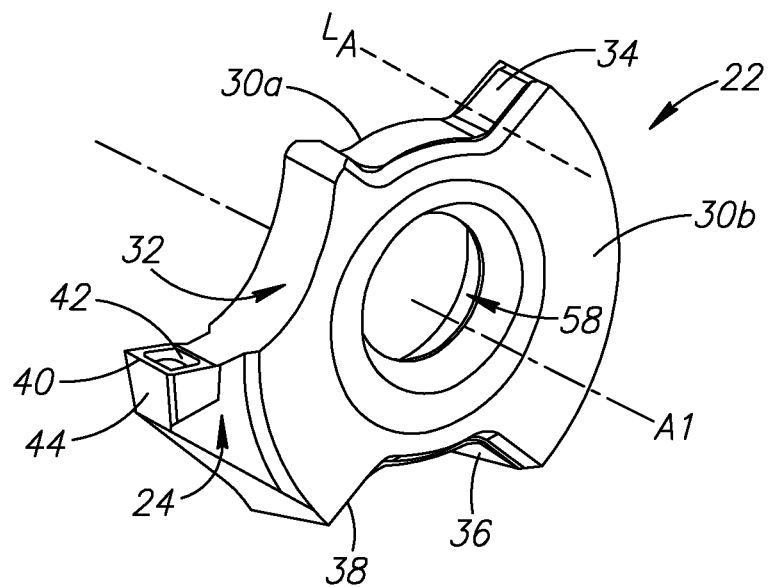
FIG. 5 is a perspective view of the cutting insert in accordance with some embodiments of the present invention.
Figure 6:
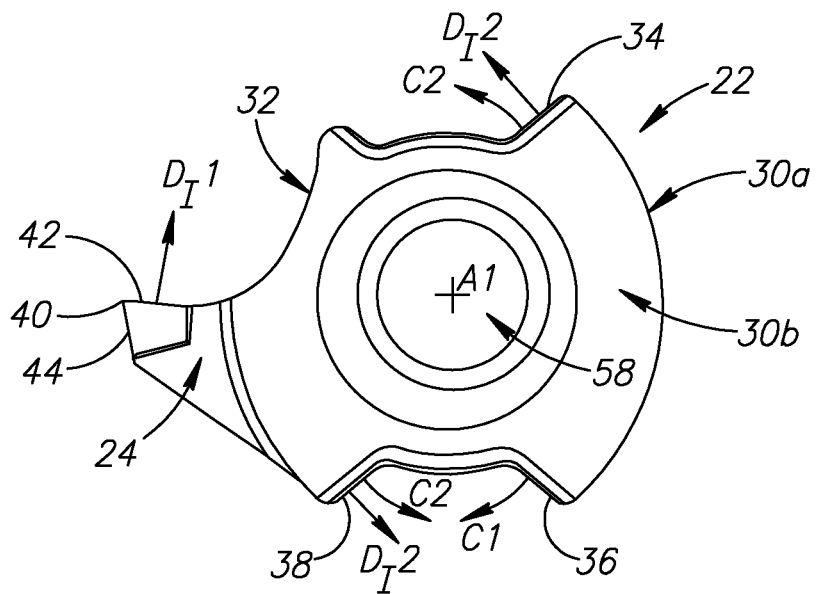
FIG. 6 is an end view of the cutting insert shown in FIG. 5.
Figure 7:
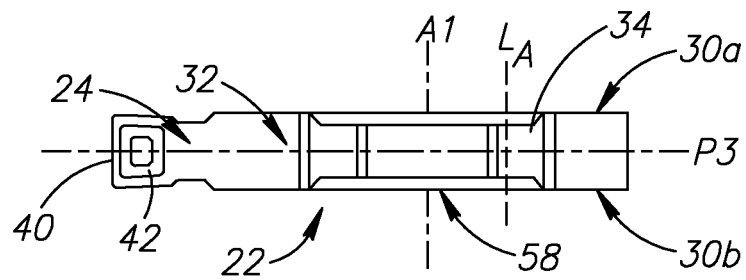
FIG. 7 is a side view of the cutting insert shown in FIG. 5.

According to the present invention, as shown in FIGS. 5 to 7, the cutting insert 22 has two opposing end surfaces 30a, 30b with an insert peripheral surface 32 and an insert central axis A1 extending therebetween. The insert peripheral surface 32 has exactly three spaced apart generally circumferentially facing abutment surfaces 34, 36, 38. When either end surface 30a, 30b is viewed along insert central axis A1, one of the three circumferential abutment surfaces 36 faces in a first generally circumferential direction C1, while the other two circumferential abutment surfaces 34, 38 face in a second generally circumferential direction C2 opposite to the first generally circumferential direction C1.

Throughout the description, the three abutment surfaces 34, 36, 38 are individually referred to as first, second and third abutment surfaces 34, 36, 38.

In some embodiments of the present invention, the two end surfaces 30a, 30b may be substantially planar and perpendicular to the insert central axis A1.

Also, in some embodiments of the present invention, each of the three abutment surfaces 34, 36, 38 may contain an imaginary straight abutment line $L_A$ parallel to the insert central axis A1.

It should be appreciated that for embodiments of the present invention having the two end surfaces 30a, 30b substantially planar and perpendicular to the insert central axis A1, and the three abutment surfaces 34, 36, 38 extending parallel to the insert central axis A1, the cutting insert 22 can be efficiently manufactured.

In some embodiments of the present invention, two of the three abutment surfaces 34, 36 may diverge in a direction diametrically away from the cutting portion 24.

As shown in FIG. 6, the first and second abutment surfaces 34, 36 diverge in a direction diametrically away from the cutting portion 24.

In some embodiments of the present invention, the cutting portion 24 may have a cutting edge 40 formed by the intersection of a rake surface 42 and a relief surface 44, with the rake and relief surfaces 42, 44 being located on the insert peripheral surface 32. The cutting edge 40 protrudes farther in a radial direction relative to the central axis A1 than any of the three abutment surfaces 34, 36, 38.

As shown in FIG. 6, the rake surface 42 may face in a first insert tangential direction $D_T1$ relative to the insert central axis A1 and two of the three abutment surfaces 34, 38 may face in a substantially opposite second insert tangential direction $D_T2$ relative to the insert central axis A1. The second insert tangential direction $D_T2$ is consistent with the aforementioned second generally circumferential direction C2.

As shown in FIG. 6, the first and third abutment surfaces 34, 38 face in the second insert tangential direction $D_T2$.

Figure 8:
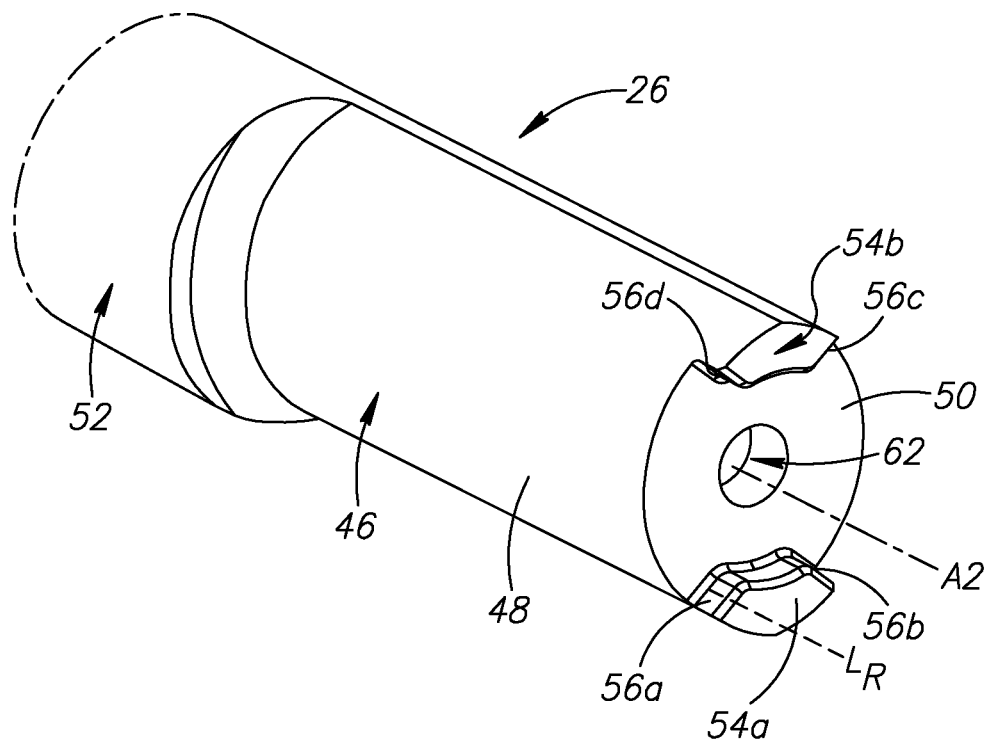
FIG. 8 is a perspective view of an insert holder in accordance with some embodiments of the present invention.
Figure 9:
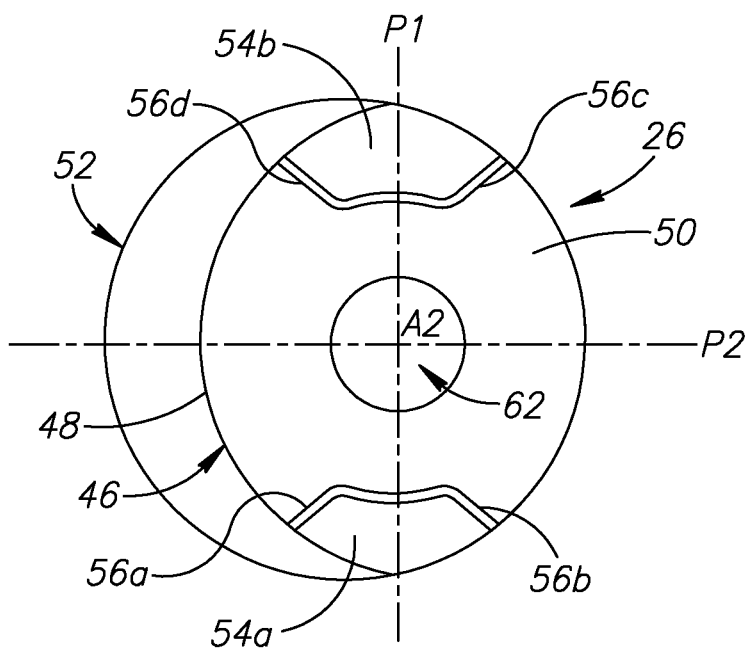
FIG. 9 is an end view of the insert holder shown in FIG. 8.

According to the present invention, as shown in FIGS. 8 and 9, the insert holder 26 has a holding portion 46 extending along a longitudinal axis A2, the holding portion 46 having a holder peripheral surface 48 and an adjacent seating surface 50.

In some embodiments of the present invention, the insert holder 26 may also include an integral shank portion 52 extending from the holding portion 46 along the longitudinal axis A2.

Also, in some embodiments of the present invention, the seating surface 50 may be transverse to the longitudinal axis A2.

Further, in some embodiments of the present invention, the seating surface 50 may be substantially planar and perpendicular to the longitudinal axis A2.

Yet further, in some embodiments of the present invention, the holder peripheral surface 48 may generally extend along the longitudinal axis A2 and form a circumferential boundary of the seating surface 50.

When the insert holder 26 is viewed perpendicular to the longitudinal axis A2, as shown in FIG. 9, the holding portion 46 may be oval shaped, thus providing improved longitudinal rigidity for internal machining operations.

Figure 3:
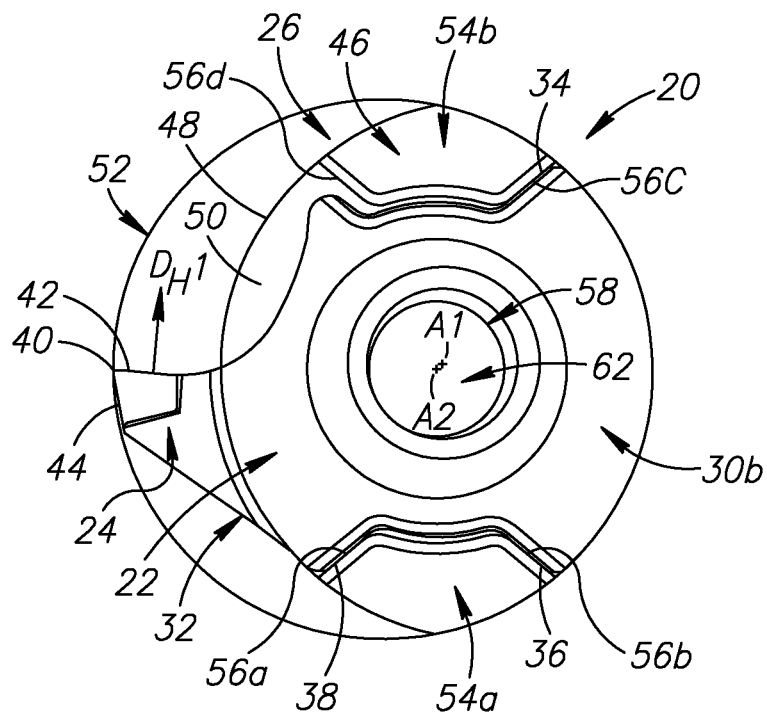
FIG. 3 is an end view of the cutting tool shown in FIG. 1, with a cutting insert in a left-hand assembly position and its fastener removed.
Figure 4:
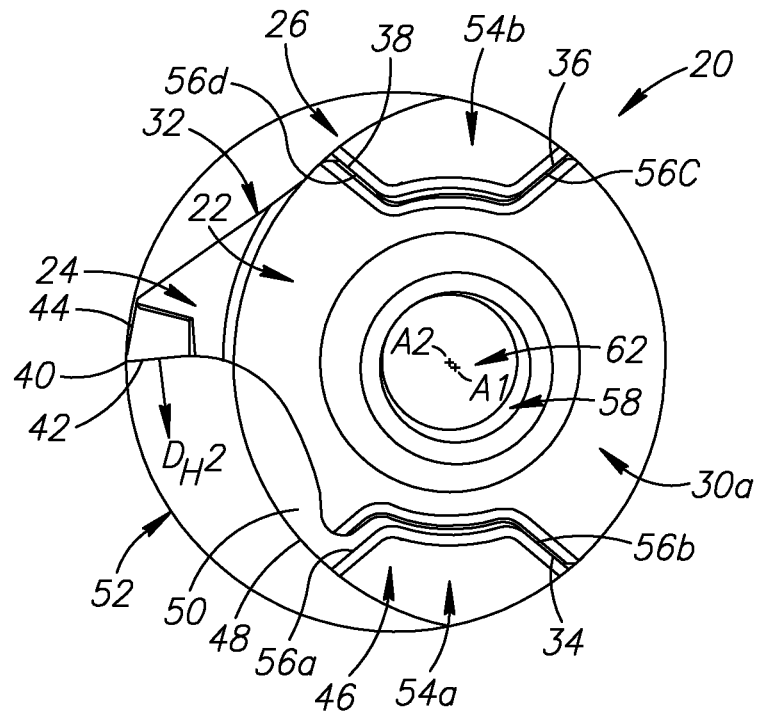
FIG. 4 is an end view of the cutting tool shown in FIG. 1, with the cutting insert in a right-hand assembly position and its fastener removed.

When the cutting tool 20 is viewed perpendicular to the longitudinal axis A2 in both the left-hand and right-hand assembly positions, as shown in FIGS. 3 and 4, respectively, only the cutting portion 24 of the cutting insert 22 may extend beyond the circumferential boundary of the seating surface 50.

According to the present invention, as shown in FIGS. 8 and 9, at least two protuberances 54a, 54b protrude from the seating surface 50, and the at least two protuberances 54a, 54b define four spaced apart reaction surfaces 56a, 56b, 56c, 56d transverse to the seating surface 50.

In some embodiments of the present invention, each of the four reaction surfaces 56a, 56b, 56c, 56d may be immediately adjacent the seating surface 50.

Throughout the description, the four reaction surfaces 56a, 56b, 56c, 56d are individually referred to as first, second, third and fourth reaction surfaces 56a, 56b, 56c, 56d.

In some embodiments of the present invention, each of the four reaction surfaces 56a, 56b, 56c, 56d may intersect the holder peripheral surface 48.

Also, in some embodiments of the present invention, each of the four reaction surfaces 56a, 56b, 56c, 56d may contain an imaginary straight reaction line $L_R$ parallel to the longitudinal axis A2.

Further, in some embodiments of the present invention, the four reaction surfaces 56a, 56b, 56c, 56d may be planar, and each reaction surface 56a, 56b, 56c, 56d may be parallel to another reaction surface 56c, 56d, 56a, 56b.

As shown in FIG. 9, the first reaction surface 56a is parallel to the third reaction surface 56c, and the second reaction surface 56b is parallel to the fourth reaction surface 56d.

In some embodiments of the present invention, exactly two spaced apart protuberances 54a, 54b may protrude from the seating surface 50, with each protuberance 54a, 54b having two reaction surfaces 56a, 56b; 56c, 56d.

As shown in FIGS. 8 and 9, a first protuberance 54a includes the first and second reaction surface 56a, 56b, and a second protuberance 54b includes the third and fourth reaction surface 56c, 56d.

Also, in some embodiments of the present invention, as shown in FIG. 9, the two reaction surfaces 56a, 56b; 56c, 56d of each protuberance 54a, 54b may diverge in a radial direction away from the longitudinal axis A2.

In some embodiments of the present invention, the seating surface 50 may exhibit mirror symmetry about a first plane P1 containing the longitudinal axis A2.

As shown in FIG. 9, the first plane P1 may bisect the two protuberances 54a, 54b.

Also, in some embodiments of the present invention, the seating surface 50 may exhibit mirror symmetry about a second plane P2 perpendicular to the first plane P1.

As shown in FIG. 9, the second plane P2 may not intersect the two protuberances 54a, 54b.

According to the present invention, in both the left-hand and right-hand assembly positions, as shown in FIGS. 3 and 4, respectively, the three abutment surfaces 34, 36, 38 are in simultaneous clamping contact with three of the four reaction surfaces 56a, 56b, 56c, 56d.

It should be appreciated that in both the left-hand and right-hand assembly positions, no additional portions or sub-surfaces of the insert peripheral surface 32, except for the three abutment surfaces 34, 36, 38, are in clamping contact with the holding portion 46 of the insert holder 26.

In the left-hand assembly position, as shown in FIG. 3, the first, second and third abutment surfaces 34, 36, 38 are in clamping contact with the third, second and first reaction surfaces 56c, 56b, 56a, respectively, and a first end surface 30a is in clamping contact with the seating surface 50.

As shown in FIG. 3, a gap is formed between the fourth reaction surface 56d and the insert peripheral surface 32.

It should be appreciated that in some embodiments of the present invention, the cutting insert 22 may be rotated 180° about the longitudinal axis A2 to a second left-hand assembly position (not shown), where the first, second and third abutment surfaces 34, 36, 38 make clamping contact with the first, fourth and third reaction surfaces 56a, 56d, 56c, respectively, and the first end surface 30a makes clamping contact with the seating surface 50.

In the right-hand assembly position, as shown in FIG. 4, the first, second and third abutment surfaces 34, 36, 38 are in clamping contact with the second, third and fourth reaction surfaces 56b, 56c, 56d, respectively, and a second end surface 30b is in clamping contact with the seating surface 50.

As shown in FIG. 4, a gap is formed between the first reaction surface 56a and the insert peripheral surface 32.

It should be appreciated that in some embodiments of the present invention, the cutting insert 22 may be rotated 180° about the longitudinal axis A2 to a second right-hand assembly position (not shown), where the first, second and third abutment surfaces 34, 36, 38 make clamping contact with the fourth, first and second reaction surfaces 56d, 56a, 56b, respectively, and the second end surface 30b makes clamping contact with the seating surface 50.

In some embodiments of the present invention, the insert central axis A1 may be parallel to the longitudinal axis A2 in both the left-hand and right-hand assembly positions.

As shown in FIG. 7, the cutting insert 22 may exhibit mirror symmetry about a third plane P3 perpendicular to the insert central axis A1, enabling equivalent machining operations to be performed in both the left-hand and right-hand assembly positions. Thus, the third plane P3 bisects the insert cutting edge 40.

In the left-hand assembly position, as shown in FIG. 3, the rake surface 42 may face in a first holder tangential direction $D_H1$ relative to the longitudinal axis A2, and in the right-hand assembly position, as shown in FIG. 4, the rake surface 42 may face in a substantially opposite second holder tangential direction $D_H2$ relative to the longitudinal axis A2.

In some embodiments of the present invention, the cutting insert 22 may include a central bore 58 extending between and opening out to the first and second end surfaces 30a, 30b.

As shown in FIG. 6, the central bore 58 may be coaxial with the insert central axis A1.

In some embodiments of the present invention, the fastener 28 may be in the form of a clamping screw 60 extending through the central bore 58 and threadingly engaging a screw bore 62 in the seating surface 50, and the screw bore 62 may be coaxial with the longitudinal axis A2.

Also, in some embodiments of the present invention, the screw bore 62 may be eccentric in relation to the central bore 58, to ensure clamping contact between the three abutment surfaces 34, 36, 38 and three of the four reaction surfaces 56a, 56b, 56c, 56d following tightening of the clamping screw 60.

During internal machining operations, the three abutment surfaces 34, 36, 38 remain in contact with three of the four reaction surfaces 56a, 56b, 56c, 56d, whereby two of the four reaction surfaces 56a, 56b, 56c, 56d tangentially support the first and third abutment surfaces 34, 38 against cutting forces acting in the second insert tangential direction $D_T2$, and another one of the four reaction surfaces 56a, 56b, 56c, 56d maintains contact with the second abutment surface 36 by virtue of the eccentricity of the screw bore 62 in relation to the central bore 58.

As discussed above, in some embodiments the cutting insert's two end surfaces 30a, 30b may be substantially planar and perpendicular to the insert central axis A1 while the insert holder's seating surface 50 may be substantially planar and perpendicular to the longitudinal axis A2. In such case, the insert's end surfaces 30a, 30b and the insert holder's seating surface 50 may both be devoid of structural formations for mating with one another, such as grooves, protrusions, inter-meshing interacting surfaces, serrations and the like, found in the aforementioned patents DE 3448086, U.S. Pat. No. 7,001,114 and KR 20-2000-0020103.

Although the present invention has been described to a certain degree of particularity, it should be understood that various alterations and modifications could be made without departing from the spirit or scope of the invention as hereinafter claimed.

What is claimed is:

1. A cutting tool (20) comprising a cutting insert (22) with a single cutting portion (24), an insert holder (26) and a fastener (28),
   the cutting insert (22) having two opposing end surfaces (30a, 30b) with an insert peripheral surface (32) and an insert central axis (A1) extending therebetween, the insert peripheral surface (32) having three spaced apart abutment surfaces (34, 36, 38), and
   the insert holder (26) having a holding portion (46) extending along a longitudinal axis (A2), the holding portion (46) having a holder peripheral surface (48) and an adjacent seating surface (50), with at least two protuberances (54a, 54b) protruding from the seating surface (50), the at least two protuberances (54a, 54b) defining four spaced apart reaction surfaces (56a, 56b, 56c, 56d) transverse to the seating surface (50),
   the cutting insert (22) being securable to the holding portion (46) in left-hand and right-hand assembly positions by means of the fastener (28), with the three abutment surfaces (34, 36, 38) in clamping contact with three of the four reaction surfaces (56a, 56b, 56c, 56d),
   wherein:
   in the left-hand assembly position, the first end surface (30a) is in clamping contact with the seating surface (50); and
   in the right-hand assembly position, the second end surface (30b) is in clamping contact with the seating surface (50).

2. The cutting tool (20) according to claim 1, wherein the seating surface (50) is transverse to the longitudinal axis (A2).

3. The cutting tool (20) according to claim 1, wherein the seating surface (50) is substantially planar and perpendicular to the longitudinal axis (A2).

4. The cutting tool (20) according to claim 1, wherein the holder peripheral surface (48) generally extends along the longitudinal axis (A2) and forms a circumferential boundary of the seating surface (50).

5. The cutting tool (20) according to claim 4, wherein when viewed perpendicular to the longitudinal axis (A2), only the cutting portion (24) of the cutting insert (22) extends beyond the circumferential boundary of the seating surface (50).

6. The cutting tool (20) according to claim 1, wherein each of the four reaction surfaces (56a, 56b, 56c, 56d) intersects the holder peripheral surface (48).

7. The cutting tool (20) according to claim 1, wherein each of the four reaction surfaces (56a, 56b, 56c, 56d) contains an imaginary straight reaction line (LR) parallel to the longitudinal axis (A2).

8. The cutting tool (20) according to claim 1, wherein the four reaction surfaces (56a, 56b, 56c, 56d) are planar, and wherein each reaction surface (56a, 56b, 56c, 56d) is parallel to another reaction surface (56c, 56d, 56a, 56b).

9. The cutting tool (20) according to claim 1, wherein the two end surfaces (30a, 30b) are substantially planar and perpendicular to the insert central axis (A1).

10. The cutting tool (20) according to claim 1, wherein each of the three abutment surfaces (34, 36, 38) contains an imaginary straight abutment line (LA) parallel to the insert central axis (A1).

11. The cutting tool (20) according to claim 1, wherein two of the three abutment surfaces (34, 36) diverge in a direction diametrically away from the cutting portion (24).

12. The cutting tool (20) according to claim 1, wherein the insert central axis (A1) is parallel to the longitudinal axis (A2) in both the left-hand and right-hand assembly positions.

13. The cutting tool (20) according to claim 1, wherein the cutting portion (24) has a cutting edge (40) formed by the intersection of a rake surface (42) and a relief surface (44), the rake surface (42) and the relief surface (44) located on the insert peripheral surface (32).

14. The cutting tool (20) according to claim 13, wherein the rake surface (42) faces in a first insert tangential direction (DI1) relative to the insert central axis (A1) and two of the three abutment surfaces (34, 38) face in a substantially opposite second insert tangential direction (DI2) relative to the insert central axis (A1).

15. The cutting tool (20) according to claim 13, wherein:
in the left-hand assembly position, the rake surface (42) faces in a first holder tangential direction (DH1) relative to the longitudinal axis (A2); and
in the right-hand assembly position, the rake surface (42) faces in a substantially opposite second holder tangential direction (DH2) relative to the longitudinal axis (A2).

16. The cutting tool (20) according to claim 1, wherein the seating surface (50) exhibits minor symmetry about a first plane (P1) containing the longitudinal axis (A2).

17. The cutting tool (20) according to claim 16, wherein the first plane (P1) bisects at least one of the protuberances (54a, 54b).

18. The cutting tool (20) according to claim 16, wherein the seating surface (50) exhibits mirror symmetry about a second plane (P2) perpendicular to the first plane (P1).

19. The cutting tool (20) according to claim 18, wherein the second plane (P2) does not intersect the at least two protuberances (54a, 54b).

20. The cutting tool (20) according to claim 18, wherein the cutting insert (22) exhibits mirror symmetry about a third plane (P3) perpendicular to the insert central axis (A1).

21. The cutting tool (20) according to claim 1, wherein exactly two spaced apart protuberances (54a, 54b) protrude from the seating surface (50), and wherein each protuberance (54a, 54b) has two reaction surfaces (56a, 56b; 56c, 56d).

22. The cutting tool (20) according to claim 21, wherein the two reaction surfaces (56a, 56b; 56c, 56d) of each protuberance (54a, 54b) diverge in a radial direction away from the longitudinal axis (A2).

23. The cutting tool (20) according to claim 1, wherein the cutting insert (22) includes a central bore (58) extending between and opening out to the two end surfaces (30a, 30b).

24. The cutting tool (20) according to claim 23, wherein the fastener (28) is in the form of a clamping screw (60) extending through the central bore (58) and threadingly engaging a screw bore (62) in the seating surface (50), and wherein the screw bore (62) is coaxial with the longitudinal axis (A2).

25. The cutting tool (20) according to claim 24, wherein the screw bore (62) is eccentric in relation to the central bore (58).

26. The cutting tool (20) according to claim 1, wherein the insert's end surfaces (30a, 30b) and the insert holder's seating surface (50) are devoid of structural formations for mating with one another.

\* \* \* \* \*